US005385631A

United States Patent [19]

Tamemasa et al.

[11] Patent Number: 5,385,631

[45] Date of Patent: Jan. 31, 1995

[54] METHOD OF MAKING PLASMA DISPLAY APPARATUS

[75] Inventors: Hiroshi Tamemasa, Kanagawa; Carl B. Wang, Tokyo, both of Japan

[73] Assignee: E. I. Du Pont de Nemours and Company, Wilmington, Del.

[21] Appl. No.: 109,874

[22] Filed: Aug. 20, 1993

[51] Int. Cl.[6] .......... B44C 1/22; B29C 37/00

[52] U.S. Cl. .......... 156/628; 156/635; 156/659.1; 156/668

[58] Field of Search .......... 156/628, 630, 633, 634, 156/635, 659.1, 668; 427/64

[56] References Cited

U.S. PATENT DOCUMENTS

| | | | |
|---|---|---|---|
| 5,032,216 | 7/1991 | Felten | 156/628 |
| 5,209,814 | 5/1993 | Felten et al. | 156/628 |
| 5,275,689 | 1/1994 | Felten et al. | 156/628 |

FOREIGN PATENT DOCUMENTS

| | | |
|---|---|---|
| 0382260 | 8/1990 | European Pat. Off. . |
| 0586943 | 3/1994 | European Pat. Off. . |
| 2668634 | 4/1992 | France . |
| 2-250236 | 10/1990 | Japan . |
| 2-250245 | 10/1990 | Japan . |
| WO-A-91 06118 | 5/1991 | WIPO . |

*Primary Examiner*—William Powell

[57] ABSTRACT

The invention relates to a method of making a plasma display apparatus comprising a plurality of stripe-shaped electrodes arranged in a matrix, a dot-shaped discharge area or pixel area at each solid intersection between said stripe-shaped electrodes and a fluorescent film formed on each of said discharge areas and adapted to emit light when said fluorescent film is excited by ultraviolet rays from the corresponding discharge area.

7 Claims, 8 Drawing Sheets

TO h, FIG. 4B

METHOD OF MAKING PLASMA DISPLAY APPARATUS

FIELD OF INVENTION

The invention relates to a method of making a plasma display apparatus comprising a plurality of stripe-shaped electrodes arranged in a matrix, a dot-shaped discharge area or pixel area at each solid intersection between said stripe-shaped electrodes and a fluorescent film formed on each of said discharge areas and adapted to emit light when said fluorescent film is excited by ultraviolet rays from the corresponding discharge area.

BACKGROUND OF THE INVENTION

The plasma display apparatus typically comprises a pair of forward and backward insulation substrates arranged opposed to each other to form a discharge space therebetween, said discharge space containing a gaseous mixture of He with a trace of Xenon and others, a group of stripe-shaped electrodes on the opposed surfaces of said insulation substrates, said stripe-shaped electrodes being arranged to form a matrix pattern in said discharge space, said matrix parting said discharge space into a plurality of discharge gas containing sub-spaces, each intersection between said stripe-shaped electrodes corresponding to a pixel, and a fluorescent film in each of said sub-spaces.

More particularly, as shown in FIG. 8, the forward insulation substrate 1 is formed of sheet glass, with the internal surface thereof including a film-type light-blocking mask 2 formed thereon and first stripe-shaped electrodes 3 arranged side by side on the internal surface of the substrate 1 in one direction, these electrodes 3 functioning as anodes. The internal surface of the other or backward substrate 4 is similarly formed of sheet glass and the internal surface thereof includes second stripe-shaped electrodes 7 arranged to extend in a direction perpendicular to the lengths of the first electrodes 3, these electrodes 7 functioning as cathodes. The first and second electrodes 3, 7 are separated from each other by dielectric partitions 8. A dot-like discharge area 9 is formed at each of the intersections between the first and second electrodes 3, 7. The discharge area 9 contains a discharge gas containing Xenon. A dot-like fluorescent film 10 for color display is formed on the surface of each of the second electrodes 3.

Each of the partitions 8 is formed to have a thickness ranged between 100 microns and 200 microns by repeated thick-film printing of insulation paste. The discharge gas is a two-component mixture gas containing He and Xe, a three-component mixture gas containing He, Xe and any other suitable component or a single gas (e.g. Xe). The discharge gas is sealed within the corresponding discharge area 9 under the pressure of 10 to 500 Torr., depending on the composition thereof.

Such a plasma display apparatus of the prior art was provided by repeating the thick film process to form partitions having a thickness ranged between 100 microns and 600 microns on an insulation substrate to define a plurality of dot-like discharge areas thereon or by performing the thick film printing process to form partitions as described, applying a paste containing silver in a groove surrounded and defined by said partitions, and firing the paste to form a group of electrodes. Thereafter, a fluorescent material is placed and fired in a recess formed by said partitions to form a fluorescent member covering one of the electrodes (i.e. one disposed on the backside of the substrate). When these frontside and backside substrates are superposed on each other, sealing, discharging and other gases are sealed therebetween to complete a plasma display apparatus.

The prior art process requires too many producing steps which would reduce the mass-producibility and increase the manufacturing cost. Since the electrodes, partitions and others are formed by repeating the thick-wall printing and firing steps, possible dot pitch is limited. The thickness of film must be controlled with high accuracy. Further, the substrates must be superposed and fixed to each other with a high precision.

SUMMARY OF THE INVENTION

An object of the invention is to provide a method which can produce readily and in good yield a plasma display apparatus having a number of electrodes arranged with high precision and reduced dot pitch.

Another object of the invention is to produce easily and inexpensively a plasma display apparatus with a good manufacturing precision to allow the stabilization of performance.

Therefore the invention provides a method of making a plasma display apparatus which comprises the steps of forming a plurality of first electrodes on one of a plurality of dielectric substrates to extend in one direction; forming a plurality of second electrodes on the other substrate to extend in another direction perpendicular to said one direction; forming a ridge on at least one of said substrates to define a plurality of pixel areas; and providing a fluorescent material in said pixel areas, the improvement in which a relief corresponding to said ridge is fabricated by the steps of:

1) providing a plurality of dielectric layers on the substrates so that at least one surface of an unpatterned first dielectric layer of a dielectric composition comprising an organic polymer comes in contact with a patterned second dielectric layer of a dielectric composition comprising an organic polymer, a solvent and dispersibility changing agent, thereby forming an assembly,
2) partially drying the assembly under a certain heating condition to diffuse a desired pattern from the surface of the second dielectric layer containing the dispersibility changing agent into the interior of the first dielectric layer and
3) developing the assembly to remove the second dielectric layer and the area of the first dielectric layer patterned by diffusion.

The invention further provides a method of making a plasma display apparatus, the improvement in which the ridge is fabricated by the steps of:

1') providing on the substrates an unpatterned first dielectric layer of a dielectric composition comprising an organic polymer and a patterned second dielectric layer of a dielectric composition comprising an organic polymer, a solvent and a dispersibility changing agent, thereby forming an assembly,
2) partially drying the assembly under a certain heating condition to diffuse a desired pattern from the surface of the second dielectric layer containing the dispersibility changing agent into the interior of the first dielectric layer, 3') partially developing the assembly to partially remove the second dielectric layer and the area of the first dielectric layer patterned by diffusion and 4) repeating the steps of 1', 2 and 3'.

The partial drying employed in the invention is performed under such a certain heating condition that the dispersibility changing agent can be diffused from the surface of the patterned dielectric layer into the interior of the unpatterned dielectric layer adjacent to said dielectric layer. The heating condition can be decided by a function of heating temperature and time which can be varied depending on the boiling points of the dispersibility changing agent, solvent or the like. In the case of using as the dielectric layer, e.g. a dielectric paste containing dibutyl phthalate plasticizer and terpineol, partial drying may be carried out at a relatively low temperature of 50°–60° C. for a short time of about 1–5 minutes.

In the practice of the invention, the dielectric layer for providing an electrical circuit on the substrate is formed in a desired pattern from a plurality of layers comprising the organic polymer. For the manufacture of an electronic circuitry, the upper layer of the organic polymer serving as the patterned dielectric layer can be of the thickness in the range of 10–30 microns. The lower layer of the organic polymer serving as the unpatterned dielectric layer which underlies the pattern and changes the dispersibility in the solvent by the diffusion of the dispersibility changing agent from the patterned layer can be of much larger thickness of 10–100 microns. The thickness of the patterned layer is primarily limited by the method of application rather than by consideration of operability.

In the practice of the invention, a diffusion patterning process can be employed which includes providing a first layer comprising an organic polymer on the substrate, further providing thereon a patterned second layer comprising an organic polymer, a solvent and a dispersibility changing agent which serves as a dispersing agent for polymer constituting the first layer, but does not dissolve in the solvent, drying the patterned second layer, removal of the solvent and diffusion of the dispersibility changing agent from the second layer into the first layer in accordance with the formed pattern, whereby the dispersibility in the solvent in the first layer is varied depending on the pattern formed in the upper layer. If the areas in the first and second layers in which the dispersibility in the solvent is varied in accordance with the formed pattern are soluble in the solvent, those areas are removed by the subsequent solvent washing (negative-working patterning process). Alternatively, if the areas in the first and second layers are insoluble in the solvent, only the areas in which the dispersibility in the solvent is varied leave after the solvent washing step (positive-working patterning process).

Through such steps, the desired pattern is formed on the substrate from the organic polyer film.

The amount of the dispersibility changing agent including solubilizer and insolubilizer in the patterned second layer (called hereafter "patterned layer") must be sufficient to provide a change of the dispersibility in the solvent by diffusion into the underlying unpatterned first layer comprising the organic polymer (called hereafter "unpatterned layer"). Thus the patterned layer will contain at least 10% weight of the dispersibility changing agent, i.e. solubilizer or insolubilizer and may contain as much as 90% weight depending on the solubility of the respective polymers.

Furthermore, in some instances, it may be desirable to add a plasticizer or other solubilizing agent to the underlying unpatterned layer in order to make the polymer more susceptible to the action of the solubilizing agent which is diffused from the patterned layer.

In general, the individual steps for preparation of components for the plasma display apparatus of the invention are similar to those which are known by those skilled in the art of conventional thick film, green tape and polymer technology.

The dielectric pastes for the formation of the unpatterned layer are typically printed twice with 200 mesh screens at one to two inches per second squeegee speed. The patterning pastes are printed over the dielectric at higher speeds, since only a small part of the screen is open mesh.

In particular, the negative-working patterning process is employed in the present invention. In this process, the patterned dielectric layer containing the solubilizer is dried or heated to allow the solubilizer to diffuse in the unpatterned dielectric layer in compliance with the pattern to be formed, and the specified area of the dielectric layer patterned by diffusion is removed with a solvent to define a discharge area on a dielectric substrate constituting a plasma display apparatus.

The conductor pastes used for the formation of electrodes are printed on the substrate with a 325 or 400 mesh screen, depending on the conductor thickness and resolution desired. Patterning pastes are likewise printed with a 325 or 400 mesh screen, to optimize the amount of plasticizer delivered to the underprint (unpatterned layer). Thinner screens and fewer prints are needed than with the dielectric, because of the thinner films typically used with conductors.

Any polymers known in the art can be used as the material for the preparation of the above pastes. Representative examples of those polymers include cellulosic polymers such as ethyl cellulose, polystyrene polyacrylates (including methacrylates), poly(vinyl acetate), poly(vinyl butyral) , poly(vinyl chloride), phenol-formaldehyde resins or the like.

It will be recognized by those skilled in polymer technology that each polymer species is compatible with a large number of different types of plasticizers or non-volatile solvents. As a result, the number of suitable polymer/solvent/non-solvent combinations is legion.

Following are examples of several commercially available plasticizers which are compatible with ethyl cellulose, a typical polymer used in the patterning paste: acid esters of abietic acid (methyl abietate), acetic acid esters (cumphenylacetate), adipic acid derivatives (e.g. benzyloctyl adipate), diisodecyl adipate, tridecyl adipate), azelaic acid esters such as diisooctyl azelate, diethylene glycol dibenzoate, triethylene glycol dibenzoate, citrates such as triethyl citrate, epoxy type plasticizers, polyvinyl methyl ethers, glycerol mono-, di-, and triacetates, ethylene glycol diacetate, polyethylene glycol 200 to 1000, phthalate esters (dimethyl to dibutyl), isophthalic acid esters (dimethyl, diisooctyl, di-2-ethylhexyl), mellitates such as trioctyl trimellitate and isooctylisodecyl trimellitate, isopropyl myristate, methyl and propyl oleates, isopropyl and isooctyl palmitates, chlorinated paraffin, phosphoric acid derivatives such as triethyl phosphate, tributyl phosphate, tributoxyethyl phosphate, triphenyl phosphate, polyesters, dibutyl sebacate, dioctyl sebacate, stearates such as octyl stearate, butoxyethyl stearate, tetramethylene glycol monostearate, sucrose derivatives such as sucrose octoacetate, sulfonic acid derivatives such as benzensulfonmethylamide, or dioctyl terephthalate.

Solvent/non-solvent systems for the ethyl cellulose/-plasticizer combinations include:

Solvents: (D.S. denotes degree of substitution with ethoxyl groups.)

D.S.=1.0 to 1.5:

Pyridine, formic acid, acetic acid, water (cold)

D.S.=2:

Methylene chloride, chloroform, dichloroethylene, chlorohydrin, ethanol, THF

D.S.=2.3:

Benzene, toluene, alkyl halide, alcohols, furan derivatives, ketones, acetic esters, carbon disulfide, nitromethane

D.S.=3.0:

Benzene, toluene, methylene chloride, alcohols, esters.

Non-Solvents:

D.S.=1.0 to 1.5:

Ethanol

D.S.=2.0:

Hydrocarbons, carbon tetrachloride, trichloroethylene, alcohols, diethyl ether, ketones, esters, water

D.S.=2.3:

Ethylene glycol, acetone (cold)

D.S.=3.0:

Hydrocarbons, decalin, xylene, carbon tetrachloride, tetrahydrofurfuryl alcohol, diols, n-propyl ether

DETAILED DESCRIPTION OF THE INVENTION

Figure 1:
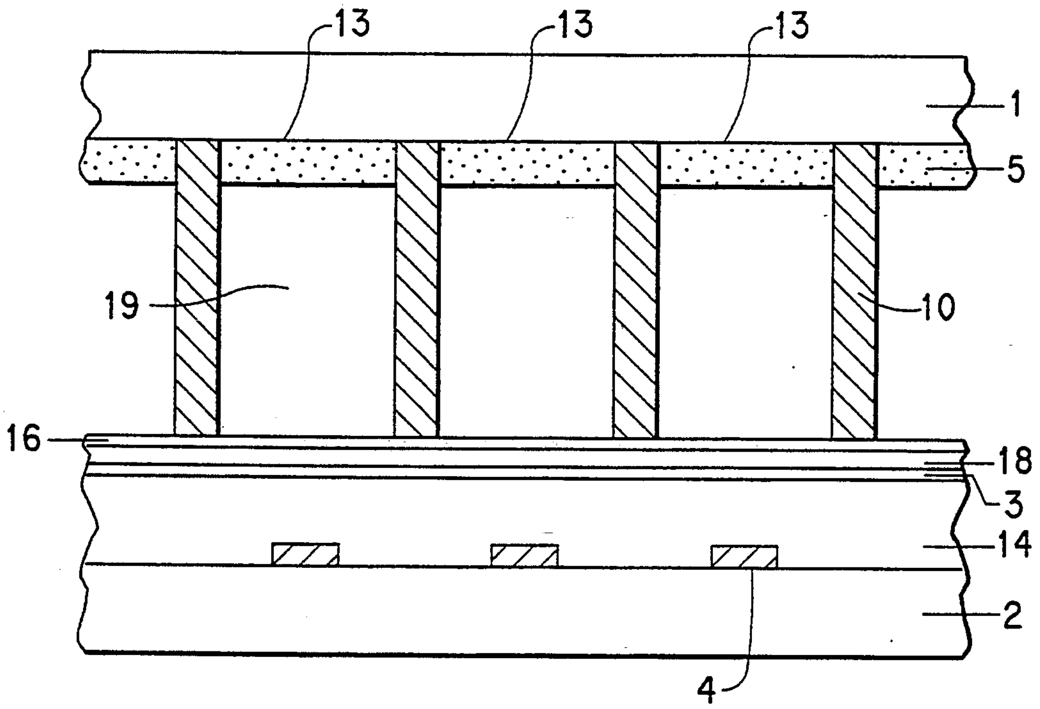
FIG. 1 is an elevational view in section of the primary parts of a plasma display apparatus constructed by the present invention, especially showing the relationship of ridges formed of the dielectric and discharge spaces with dielectric substrates.
Figure 2:
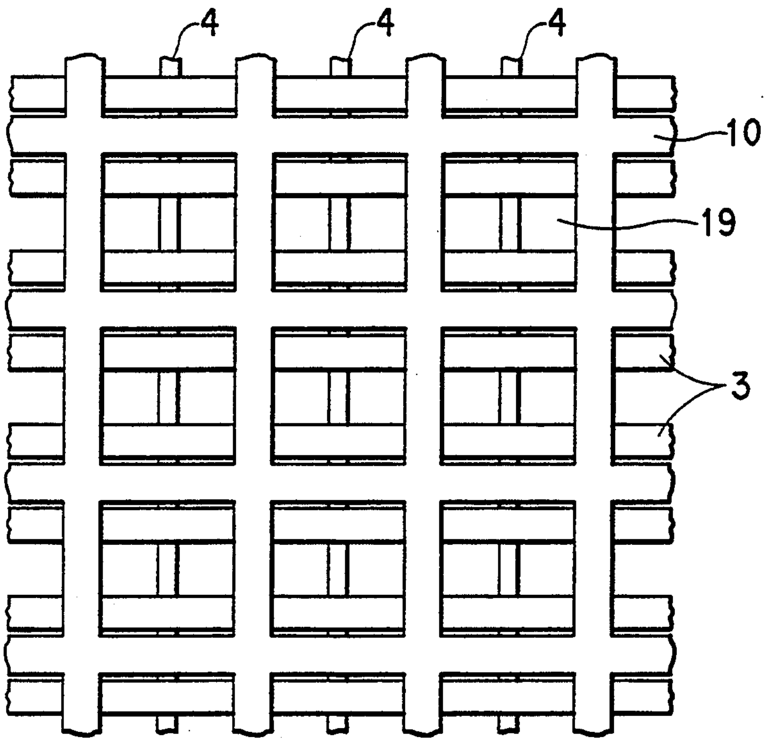
FIG. 2 is a foreshortened view in plan, partly in section of the plasma display apparatus constructed by the invention.

Referring first to FIGS. 1 and 2, there is shown a plasma display apparatus of the present invention which comprises first and second dielectric substrates 1, 2 of a sheet glass having a thickness equal to 2 mm, a plurality of X electrodes (first electrodes) laterally extending on the inner face of the first substrate 1, a plurality of Y electrodes (second electrodes) longitudinally extending on the inner face of the second substrate 2, and a plurality of fluorescent materials 5 for converting discharged ultraviolet rays into visible rays. The plasma display apparatus also comprises a matrix-like (or mesh-like) ridge 10 which defines a plurality of pixel areas and is adapted to provide a partition wall for maintaining the spacing between the first and second substrates 1, 2. Each of the (line) X electrodes 3 is disposed on dielectric layer 14 to electrically insulate from the (column) Y electrodes, and another dielectric layer 18 is arranged over the line electrodes 3 to separate from a discharge space 19. Protective layer 16 may be provided on dielectric layer 18. Each of the fluorescent materials 5 is formed by pouring a luminescence color fluorescent material into each of recesses 13 which are formed by the matrix-like ridge 10. The fluorescent material may be $Zn_2SiO_4$:Mn for green color, ($Y_1$ Gd) $BO_3$:$Eu^{3+}$ for red color or $BaMgAl_{14}O_{23}$:$Eu^{2+}$ for blue color.

A discharge space 19 formed between the substrates 1, 2 by the matrix-like ridge 10 is filled with any suitable mixture gas, for example, consisting of neon and xenon. A discharge cell is formed at each of the intersections between the X electrodes 3 and the Y electrodes 4. When each discharging cell is energized, one fluorescent material 5 corresponding to the energized cell is excited to emit light.

In such an arrangement, the fluorescent material 5 may be selectively excited through the intersecting electrodes 3 and 4.

Figure 3:
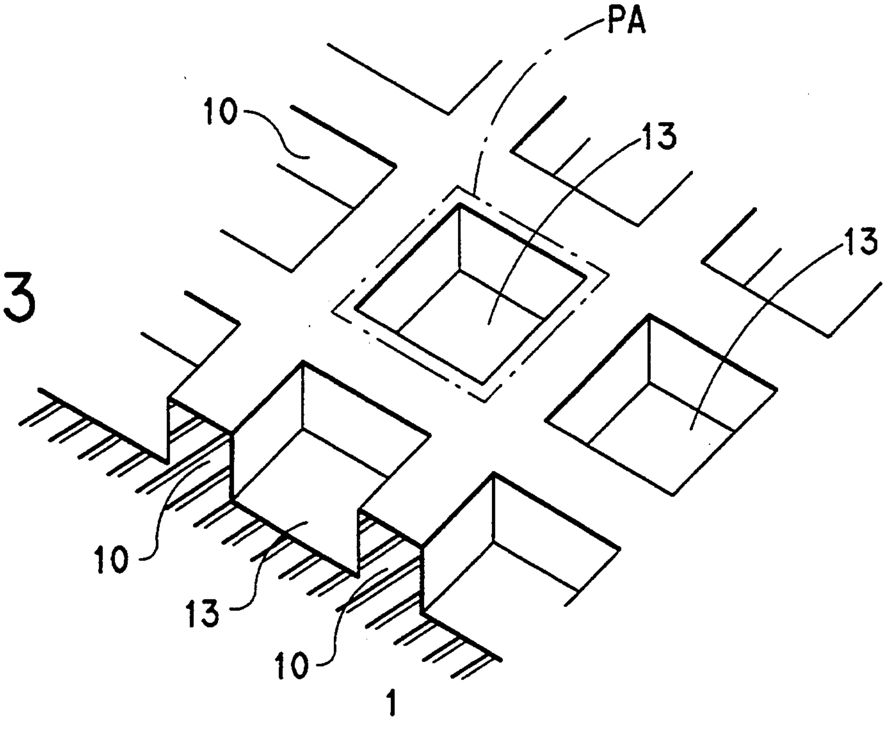
FIG. 3 is a perspective view showing the structures of ridges and Y electrodes in the plasma display apparatus constructed by the invention.

The ridges 10 in the plasma display apparatus shown in FIGS. 1 to 3 can be formed, for example by a negative-working patterning process shown in FIGS. 4 to 7. That is, the ridges are formed through the formation of a negative pattern and development (FIG. 4) or the formation of a negative pattern and simultaneous development (FIG. 5) using a diffusion patterning process. These processes are largely classified into three negative-working patterning processes which include a process comprising the step of incompletely removing the solvent (FIG. 4), a process comprising the step of partially developing and the combination thereof (not shown).

Figure 4A:
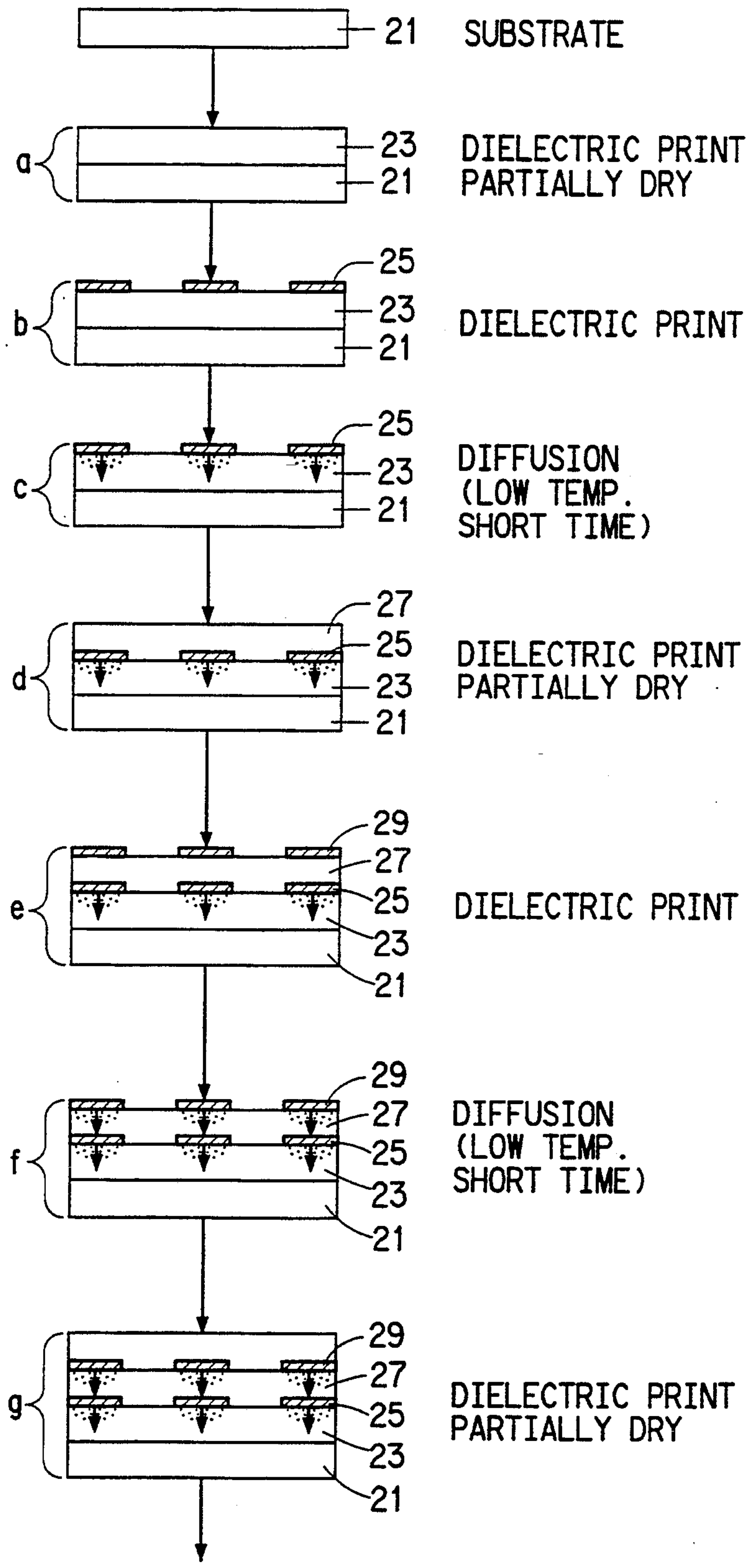
FIGS. 4A and 4B are views of a flow sheet illustrating one example to form a negative-working pattern by a diffusion patterning process of the invention.
Figure 4B:
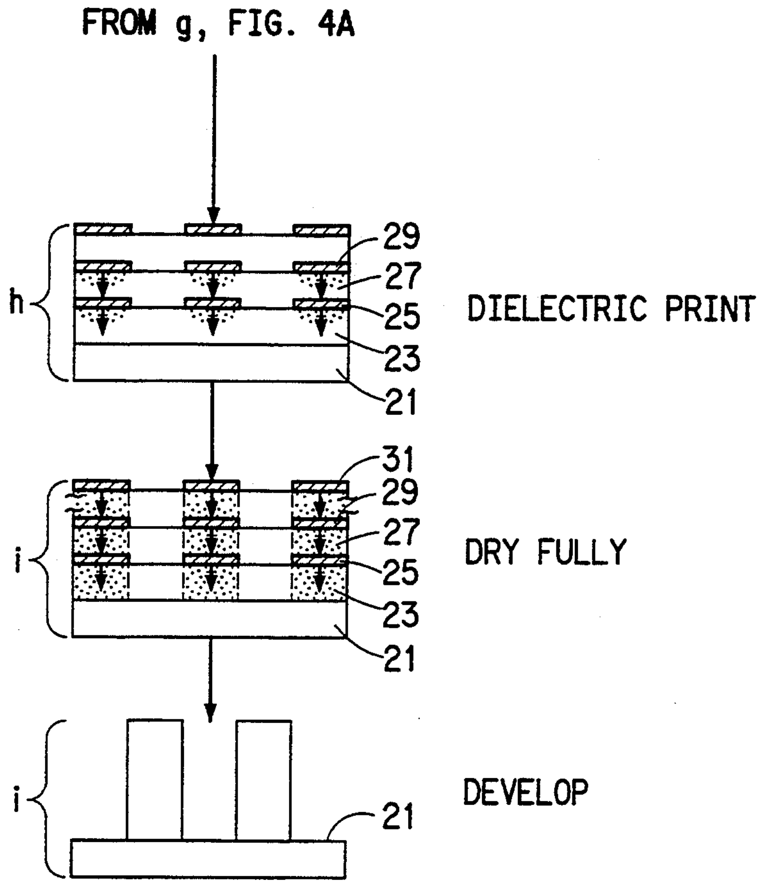

As shown in FIG. 4, a thick film dielectric paste layer 23 is applied on a glass substrate 21 by screen printing. The thick film paste is comprised of finely divided glass particles dispersed in an organic medium comprising an acid labile polymer dissolved in dibutyl phthalate plasticizer and terpineol. After printing the layer 23, the layer is heated at a temperature of about 50°-60° C. for about 1-5 minutes to incompletely remove terpineol (see, FIG. 4 (*a*)).

A second patterned layer 25 is screen-printed on a thick film layer 23 containing a part of a solvent. The second layer is a liquid solution comprising p-toluenesulfonic acid, dibutyl phthalate and terpineol (see, FIG. 4(*b*)).

After formation of the patterned layer 25, an assembly is dried by heating at a relatively lower temperature of 50°-60° C. for about 1-5 minutes, upon which terpineol evaporates from the layer 25, p-toluenesulfonic acid and dibutyl phthalate diffuse into an area in contact with the thick film patterned dielectric layer 25 of the underlying unpatterned layer comprising the thick film dielectric paste and the acid reacts with the acid labile group of the polymer in the unpatterned layer 23 to render part of the polymer water-dispersible (see, FIG. 4(*c*)).

On the thick film patterned dielectric layer 25 is screen-printed the unpatterned layer 27 comprising the second thick film dielectric paste having the same composition as the first unpatterned layer 23, which is then heated at a temperature of about 50°–60° C. for about 1–5 minutes as in the step (a) in FIG. 4 to incompletely remove terpineol (see, FIG. 4(*d*)). Subsequently, the second patterned layer 29 having the same composition as the first patterned layer is screen-printed on the second unpatterned layer 27 in semi-dried state from which only part of the solvent was evaporated. The assembly formed of the patterned layers 29, 25 and the unpatterned layers 27, 23 in two layers is dried at a lower temperature of about 50°–60° C. for about 1–5 minutes, whereby terpineol as the solvent evaporates from the second patterned layer 29, the solvent contained in the layer 29 is incompletely removed and simultaneously the acid and dibutyl phthalate diffuse into the area in contact with the patterned dielectric layer 29 of the underlying unpatterned dielectric layer 27, and the acid reacts with the acid labile group of the polymer in the unpatterned layer 27 to make part of the polymer water-dispersible (see, FIG. 4(*f*)). At the same time, a diffusion of the dispersibility changing agent into the unpatterned layer 23 through the patterned layer 25 is enhanced together with the evaporation of the solvent from the patterned layer 25.

In the above manner, the steps (a) to (c) in FIG. 4 are repeated N times. The assembly of the thick film dielectric corresponding to the thickness (TXN) of the unpatterned layer of the dielectric paste is completely dried, for example by heating at about 90° C. for about 10 minutes, by which the desired pattern is formed by diffusion within the unpatterned layer and the whole pattern forming areas become a solvent-soluble state (see, FIG. 4(*i*)).

The patterned layer comprises principally small amounts of residual acid and dibutyl phthalate. The assembly is washed with water having a pH of at least 7 to remove the underlying diffusion patterned and solvent-soluble areas 31 (called hereafter "pattern forming area"). Most of the pattern forming areas comprises the solubilized acid labile polymer and other materials in an image area underlying the thick film layer. After completion of washing, only the pattern forming area 31 is removed from the assembly of the thick film dielectric to expose the surface of the substrate 21 corresponding to the pattern forming area 31, whereby very precise negative image (relief) leaves on the surface of the substrate 21 (see, FIG. 4(*j*)). Subsequently, the thus patterned dielectric is fired.

The ridge 10 is formed by the patterned dielectric on the dielectric substrate 1 as shown in FIG. 1. A pair of the dielectric substrates at each of the display and back surface sides is oppositely superimposed on each of recesses 13 having a depth of, e.g., 25–600 μm depending on the pitch size of pixel, thereby to form a discharge space 19 for each pixel area as shown in FIG. 1. The conductor is applied onto the opposite second substrate to form a line electrode group. The line electrode groups 3, 4 are formed by screen-printing (thick film process) on the substrate a paste comprising a metal component selected from the group consisting of Au, Ni, Al, Cu and Ag to provide an electrode layer and firing the layer. The width of the electrode layer may be larger than that of the final electrodes, since the electrode groups 3, 4 are formed by partially removing the electrode layer.

FIG. 4 illustrates a negative-working patterning process comprising the steps of dielectric printing/incomplete drying under the condition wherein the dielectric patterned and unpatterned layers are partially dried at an elevated temperature, e.g. 90° C. for a long time without complete removal of the solvent in the dielectric layer to maintain part of the solvent contained in the layer; DP print; DP diffusion (drying at low temperature for short time); and development. This patterning process of the present invention can prevent the formation of barrier referred to as "gap" which is brought by over-drying of the polymer in the layer and dense bond of the polymers as a result of repeated high temperature drying of the patterned and unpatterned dielectric layers comprising organic polymer which has been encountered in the prior art. Thus, the present invention can provide the advantages that the dielectric ridges forming a discharge space in the plasma display apparatus can be fabricated with high precision in compliance with the desired pattern with no obstacle to the permeation of the developer in the development step into the pattern forming area formed in the assembly of the dielectric layer.

Further, the present invention can perform the fabrication of electrodes, ridges or the like by a thick film printing technique in the production of the plasma display apparatus requiring the precision of film thickness and having the oppositely arranged structure of a pair of the glass substrates at the display and back surface sides. As the precision of each film thickness is closely required, the film thickness control of the dielectric paste constituting the patterned and unpatterned layers on printing and drying is required and in particular the lamination of the patterned layer and the unpatterned layer is frequently done, the surface smoothness of each dielectric paste layer and the uniformity of the film thickness are required. According to the patterning process of the present invention, when the unpatterned layer or the patterned layer is placed on the underlying patterned layer or the underlying unpatterned layer, the dielectric paste layer is not in the completely dried state in which all solvents were evaporated from the underlying paste, but in the state containing part of the solvent. Thus, surface smoothness of the underlying layers and uniformity of the film thickness can be readily achieved.

Subsequently, on the overall surface of the glass substrate 2 is thick film-printed with a lead borate, low melting glass paste containing a dielectric material such as aluminum oxide or silicon oxide, which is then fired to form dielectric layers 14 and 18. Further, a protective layer 16 consisting of magnesium oxide may be coated successively.

Each of the recesses 13 defined by the ridge 10 is filled with a fluorescent material 5 at the bottom.

For monocolor display, each of the fluorescent material 5 is formed by depositing a fluorescent material on the inner bottom face 13 of the corresponding recess, for example, $Zn_2SiO_4$ emitting a green-colored light. For a multicolor display, fluorescent materials for emitting red(R)-, green(G)- and blue(B)-colors are sequentially deposited on the inner bottom face of each discharge area for each pixel area line in the X or Y direction or for each pixel area PA (FIG. 3).

Thereafter, the glass substrate 2 is superposed over the display side glass substrate 1. The space between the glass substrates 1, 2 is sealed by sealing glass and at the same time a discharge mixture gas is sealingly enclosed in the space. A plasma display (PD) apparatus is thus assembled.

If desired, the said diffusion patterning process may be applied to both substrates 1 and 2 to fabricate the ridge or the entire partition wall.

Figure 5:
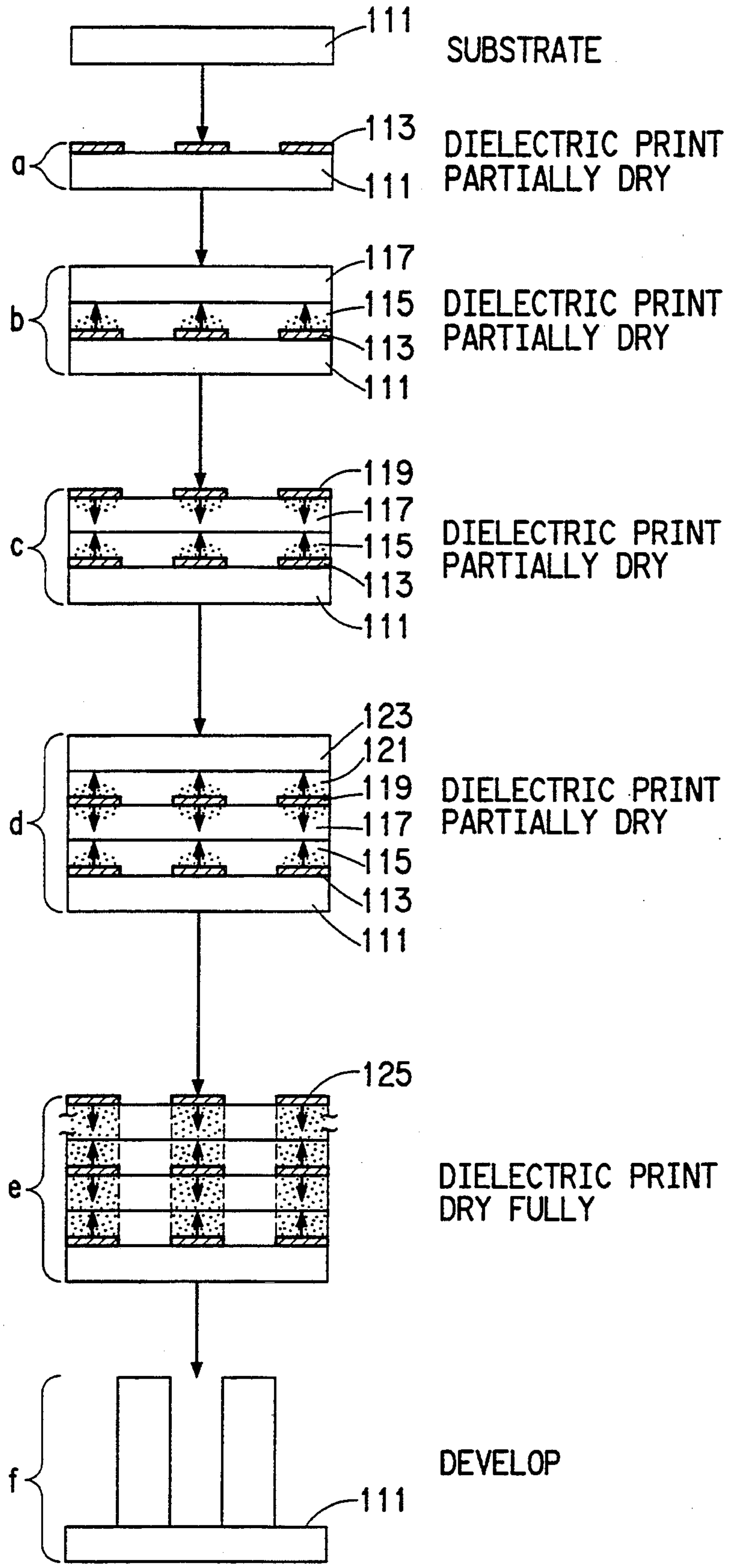
FIG. 5 is a flow sheet illustrating another example according to the invention.
Figure 6:
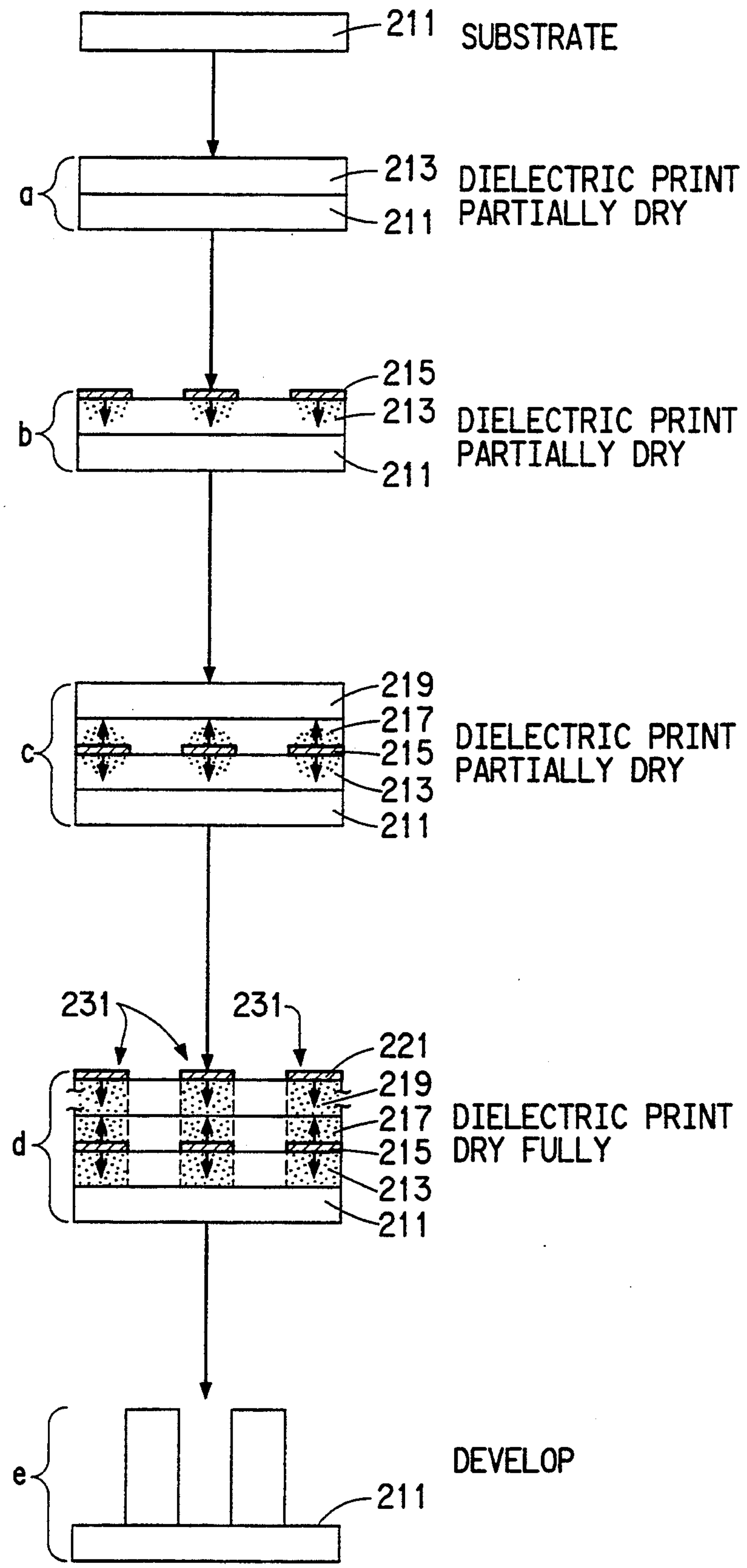
FIG. 6 is a flow sheet illustrating other example according to the invention.

Referring to FIGS. 5 and 6, an alternative process of fabricating a ridge or partition wall in the plasma display apparatus of the invention, for instance, a patterning process including the step of incompletely removing a solvent in the dielectric layers will be explained in order of the process step.

First, the alternative process shown in FIG. 5 is explained. A first patterned layer 113 comprising, e.g., p-toluenesulfonic acid, dibutyl phthalate and terpineol is applied on a substrate 111 and this layer is dried at a temperature of e.g. about 50°–60° C. for about 1–5 minutes (see, FIG. 5(*a*)).

Then, a first unpatterned layer 115 and a second unpatterned layer 117 which are soluble in a predetermined solvent are provided on the first patterned layer 113, which is dried by heating at a temperature of e.g. 50°–60° C. for about 1–5 minutes. Terpineol evaporates from the first patterned layer 113, the acid and dibutyl phthalate diffuse into the area of the upper thick film dielectric unpatterned layer 115 in contact with the patterned layer 113, by which the acid reacts with the acid labile group of the polymer in the unpatterned layer 115 to render part of the polymer water-dispersible. Subsequently, the second unpatterned layer 117 of the thick film dielectric is screen-printed on the first unpatterned layer 115, which is then dried by heating at a temperature,. of e.g. about 50°–60° C. for about 1–5 minutes as in the step (a) (see, FIG. 5(*b*)).

A second patterned layer 119 is screen-printed on the second unpatterned layer 117, which is dried by heating at a temperature of e.g. about 50°–60° C. for about 1–5 minutes. The solvent, terpineol evaporates from the second patterned layer 119, the acid and dibutyl phthalate diffuse into the area of the underlying thick film dielectric unpatterned layer 117 in contact with the patterned layer (see, FIG. 5(*c*)).

Further, two layers of unpatterned layers 121, 123 are simultaneously superimposed on the second patterned layer 119, which is then dried at a temperature of e.g. about 50°–60° C. for about 1–5 minutes (see, FIG. 5(*d*)).

The steps (b) to (d) shown in FIG. 5 are repeated N times to form an assembly of the thick film dielectric having the thickness (height) corresponding to the thickness TXN of the unpatterned layer, which is completely dried by heating e.g. at 90° C. for about 10 minutes. As a result, the desired pattern is formed by diffusion in the unpatterned layer of the assembly and the whole pattern forming areas 125 are in the state soluble in the solvent (see, FIG. 5(*e*)).

Through a similar development as explained for FIG. 4, only the pattern forming areas 125 are removed to leave very precise negative image (relief) on the surface of the substrate 111 (see, FIG. 5(*f*)). Subsequently, the thus patterned dielectric is fired.

Next, a further. alternative process shown in FIG. 6 is explained below. A first unpatterned layer 213 of the thick film dielectric paste is screen-printed on a glass substrate 211. The thick film dielectric paste comprises finely divided glass particles dispersed in an organic medium containing the acid labile polymer dissolved in dibutyl phthalate plasticizer and terpineol. Then, the first unpatterned layer is heated at a temperature of about 50°–60° C. for about 1–5 minutes to incompletely remove terpineol (see, FIG. 6(*a*)).

Subsequently, a first patterned layer 215 is screen-printed on a first unpatterned layer 213 containing part of the solvent. The first patterned layer is a liquid solution comprising p-toluenesulfonic acid, dibutylphthalate and terpineol. After formation of the patterned layer 215, an assembly is dried by heating at a relatively lower temperature of 50°–60° C. for about 1–5 minutes, upon which terpineol evaporates from the layer 215, p-toluenesulfonic acid and dibutylphthalate diffuse into an area in contact with the thick film patterned dielectric layer 215 of the underlying unpatterned layer comprising the thick film dielectric paste and said acid reacts with the acid labile group of the polymer in the unpatterned layer 213 to render part of the polymer water-dispersible (see, FIG. 6(*b*)).

On the thick film patterned dielectric layer 215 is screen-printed the second and third unpatterned layers 217, 219 comprising the second thick film dielectric paste having the same composition as the first unpatterned layer 213, which is then heated at a temperature of about 50°–60° C. for about 1–5 minutes as in the step (a) in FIG. 4 to incompletely remove terpineol (see, FIG. 6(*c*)).

Subsequently, the third patterned layer 221 having the same composition as the first patterned layer is screen-printed on the third unpatterned layer 219 in a semi-dried state from which only part of the solvent was evaporated. The assembly formed of the patterned layers 221, 215 and the unpatterned layers 219, 217 in two layers is dried at a lower temperature of about 50°–60° C. for about 1–5 minutes, whereby terpineol as the solvent evaporates from the third patterned layer 221, the solvent contained in the layer 221 is incompletely removed and simultaneously the acid and dibutylphthalate diffuse into the area in contact with the patterned dielectric layer 221 of the underlying unpatterned dielectric layer 219, and the acid reacts with the acid labile group of the polymer in the unpatterned layer 219 to render part of the polymer water-dispersible. At the same time, a diffusion of the dispersibility changing agent into the unpatterned layer 217 through the patterned layer 215 is enhanced together with the evaporation of the solvent from the patterned layer 25.

In the above manner, the steps (a) to (c) in FIG. 6 are repeated N times. The assembly of the thick film dielectric corresponding to the thickness (TXN) of the unpatterned layer of the dielectric paste is completely dried, for example by heating at about 90° C. for about 10 minutes, by which the desired pattern is formed by diffusion within the unpatterned layer and the whole pattern forming areas become a solvent-soluble state (see, FIG. 6(*d*)).

The patterned layer comprises principally small amounts of residual acid and dibutyl phthalate. The assembly is washed with water having a pH of at least 7 to remove the underlying diffusion patterned and solvent-soluble areas 231 (called hereafter "pattern forming area"). Most of the pattern forming areas comprises the solubilized acid labile polymer and other materials in an image area underlying the thick film layer. After completion of washing, only the pattern forming area 231 is removed from the assembly of the thick film dielectric to expose the surface of the substrate 211 corresponding to the pattern forming area 31, whereby very precise negative image (relief) leaves on the surface of the substrate 211 (see, FIG. 6(*e*)). Subsequently, the thus patterned dielectric is fired. The ridge 10 is formed by the patterned dielectric on the dielectric substrate 211.

Figure 7:
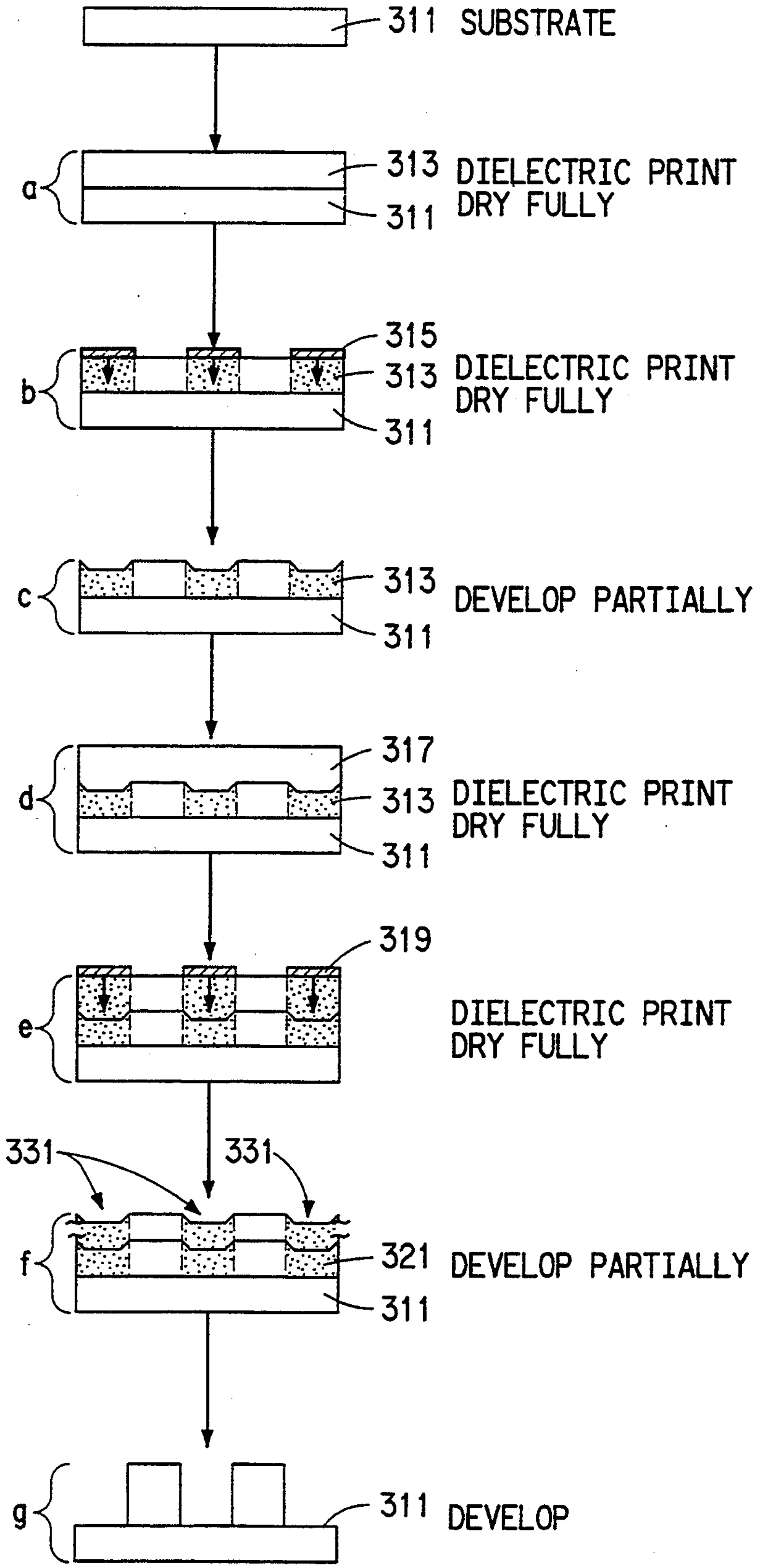
FIG. 7 is a flow sheet illustrating further example according to the invention.
Figure 8:
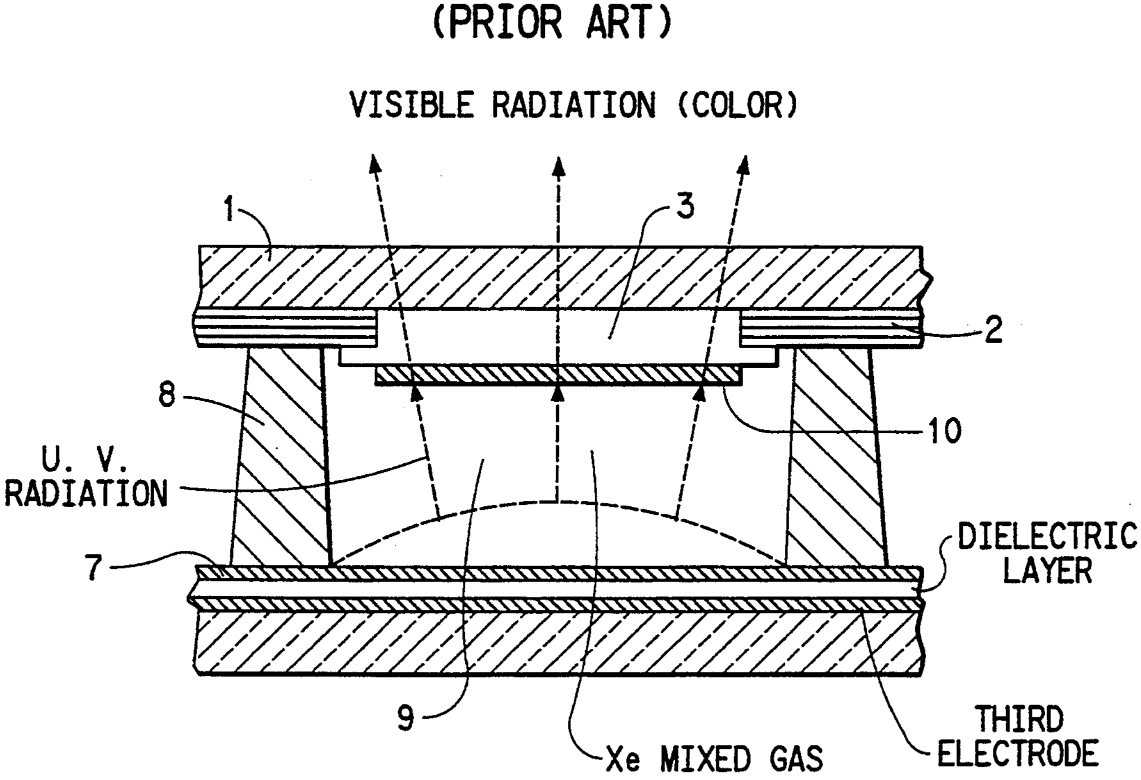
FIG.8 (PRIOR ART)
FIG. 8 is a cross-section illustrating the primary parts of a plasma display apparatus constructed by the prior art.

FIG. 7 shows a negative-working diffusion patterning process including a partial development step according to the present invention. In Step (a) shown in FIG. 7, a thick film dielectric paste layer 313 formed of finely divided glass particles dispersed in an organic medium containing an acid labile polymer dissolved in dibutyl phthalate plasticizer and terpineol is applied on a glass substrate 311 by screen printing. The printed layer 313 is heated at 80° C. for about 1–10 minutes to remove terpineol (see, FIG. 7(*a*)).

Subsequently, the patterned layer 315 is screen-printed on a layer 313 not containing the solvent. The patterned layer is a liquid solution comprising p-toluenesulfonic acid, dibutyl phthalate and terpineol. After formation of the patterned layer 315, an assembly is heated at 90° C., upon which terpineol evaporates from the layer 315, p-toluenesulfonic acid and dibutyl phthalate diffuse into an area underlying the thick film dielectric layer and the acid reacts with the acid labile group of the polymer to render part of the polymer water-dispersible (see, FIG. 7 (*b*)).

The patterned layer 315 comprising principally small amounts of residual acid and dibutyl phthalate is washed with water having a pH of at least 7, for example at a temperature of about 25°–35° C. for 10–20 seconds to remove partially the underlying diffusion patterned layer 313. Most of the layer 313 comprises a solubilized acid labile polymer and other materials in an image area underlying the thick film layer (see, FIG. 7(*c*)). After completion of development of the diffusion patterned layer 313, reverting to the above step (a), a thick film paste layer 317 is screen-printed thereon and dried by heating at 80° C. for about 1–10 minutes to remove terpineol (see, FIG. 7 (*d*)). A patterned layer 319 is applied onto the dielectric paste layer 317 and an assembly is heated at 90° C. (see, FIG. 7(*e*)). Subsequently, the step of removing partially the diffusion patterned layer is repeated N times in a similar manner as in step (c) to form an assembly of the thick film dielectric corresponding to the thickness (TXN) of the unpatterned layer of the dielectric paste, after which the desired pattern is formed by diffusion in the unpatterned layer and the whole pattern forming areas become a solvent-soluble state (see, FIG. 7(*f*)). The whole pattern forming areas 331 are removed by washing at a temperature of about 45° C. with water having a pH of at least 7, by which very precise negative image (relief) leaves on the surface of the substrate 311 (see, FIG. 7(*g*)).

In the above embodiments, the ridge 10 has been explained about the case of utilizing as a partition wall for parting a display pixel, but the ridge may be provided on a glass substrate 2 at the display side, separately of the ridges 10 provided on the first substrate 1.

According to the present invention, the plasma display apparatus having a number of electrode groups arranged in high precision can be readily produced in good yield. High manufacturing precision results in stabilization of performance.

The following example illustrates the formulation of the dielectric paste and patterning paste.

EXAMPLE 1

Two pastes were formulated as follows:

| Dielectric Paste | |
|---|---|
| Glass A | 15.78 grams |
| Glass B | 0.83 |
| Alumina A | 7.89 |
| Alumina B | 3.24 |
| Cobalt Aluminate | 0.08 |
| Polymethyl Methacrylate | 5.36 |

-continued

| | |
|---|---|
| Wetting Agent | 1.25 |
| t-Butylanthraquinone | 0.50 |
| Shell Ionol ® | 0.03 |
| Butyl Carbitol ®, Acetate | 14.10 |
| Butyl Benzyl Phthalate | 0.75 |
| Glass A | |
| $SiO_2$ | 56.2% wt. |
| PbO | 18.0 |
| $Al_2O_3$ | 8.6 |
| CaO | 7.4 |
| $B_2O_3$ | 4.5 |
| $Na_2O$ | 2.7 |
| $K_2O$ | 1.6 |
| MgO | 0.8 |
| $ZrO_2$ | 0.2 |

Glass A has a $D_{50}$ of ca. 4 to 4.5 microns; it is milled and classified to remove coarse and fine fractions. Its $D_{10}$ is about 1.6 microns; and $D_{90}$ is 10–12 microns. Surface area is 1.5 to 1.8 $m^2/g$.

Glass B is a barium borosilicate glass used to lower the sintering temperature of the dielectric composite, due to the large particle size of glass A. Its formula follows:

| | |
|---|---|
| BaO | 37.5% wt. |
| $B_2O_3$ | 38.3 |
| $SiO_2$ | 16.5 |
| MgO | 4.3 |
| $ZrO_2$ | 3.0 |

Alumina A is a 1 micron powder with a narrow particle size distribution: $D_{10}$, $D_{50}$, and $D_{90}$ are, respectively, ca. 0.5, 1.1, and 2.7 microns. It is classified by settling to remove coarses and fines. Surface area is about 2.7–2.8 $m^2/g$.

Alumina B is a 0.4 micron average particle size powder with surface area of about 5 $m^2/g$.

| Patterning Paste | |
|---|---|
| Alumina A | 60.0 grams |
| Hydrogenated Castor Oil | 1.4 |
| Mineral Spirits | 4.0 |
| Colorant | 2.2 |
| Ethyl Cellulose T-200 | 4.3 |
| Terpineol | 11.9 |
| Butyl Benzyl Phthalate | 16.2 |

The above paste compositions were prepared in the manner well known to those skilled in formulation of thick film materials and were ready for printing:

The materials were processed by printing the dielectric one, two, or three times, with each print followed by drying 1 to 5 minutes at 40° to 60° C. The patterning paste was then printed by using a via fill screen with several sizes of via openings. The patterning paste was then dried at 80° to 100° C. for 5 to 10 minutes.

The pattern was then generated in the dielectric by immersing the overprinted layers in 1.1.1-trichloroethane with ultrasonic agitation until the overprinted areas were removed and the areas underlying the overprinted patterning paste were dissolved away.

The ridge of the dielectric was resolved with the height of up to 300 microns in the width of 80–150 microns and with good edge definition, which indicates much superiority in resolution and thickness to that achieved by a single patterning procedure with screen printing.

The following Table illustrates a number of acrylic polymer/plasticizer/solvent systems which have been demonstrated for use in the method of the invention.

| Alternative Acrylic Material Systems | | | |
|---|---|---|---|
| | Overprint | | |
| Underprint Resin | Solubilizer (Negative) | Non-solubilizer (Positive) | Patterning Solvent |
| Polymethyl-methacrylate | | | Dibutyl |
| Phthalate | Methyl Chloroform | | |
| Polymethyl-acrylate | Butyl Benzyl-phthalate | | |
| | Ethylhydroxy-ethyl Cellulose | | |
| | | Polymethyl Methacrylate | Ethanol/Water Ammonia |
| Carboset ® XPD-1234 | Triethanol-amine | | Water |
| | | Dibutyl Phthalate | $K_2CO_3$/Water |

The above resins may be combined. For example, methyl and ethyl methacrylate may be combined to allow positive or negative-working resists. In the case of methyl methacrylate/ethyl methacrylate combinations, plasticizers such as triethylene glycol would produce a negative-working resist in ethanol pattern generating solvent.

The following examples illustrate a diffusion patterning process which can be used in the production of the plasma display apparatus of the invention.

EXAMPLES 2 AND 3

Aqueous Diffusion Patterning

A calcium zinc silicate glass was formulated with a cellulose vehicle and 3% butyl benzyl phthalate. A film of each paste was screen-printed onto an alumina substrate and dried at 95°-100° C. A patterning paste containing 7 g alumina, 3.5 g Tergitol ® TMN-6, 3.15 g of terpineol isomers and 0.35 g ethyl cellulose was screen-printed onto the dried dielectric paste layers and heated at 95°-100° C. to dry the overprinted paste and to effect diffusion of the Tergitol detergent into the underlying dielectric layer. When the dried layer was washed with tap water, six mil (about 153 microns) vias were clearly resolved. In subsequent tests, it was found that the use of additional plasticizer in the underlying polymer layer resulted in further improved resolution.

It is preferred to carry out the diffusion patterning process to fabricate a partition wall (ridge) in the plasma display apparatus as described in Examples 2-3. Nevertheless, it can be carried out by other methods, for example by overprinting an aqueous developable polymer with a water immiscible plasticizer to protect the areas underneath, then removing the unplasticized material by aqueous solubilization.

We claim:

1. A method of making a plasma display apparatus which comprises the steps of forming a plurality of first electrodes on one of a plurality of dielectric substrates to extend in one direction; forming a plurality of second electrodes on a second substrate to extend in another direction perpendicular to said one direction; forming a ridge on at least one of said substrates to define a plurality of pixel areas; and providing a fluorescent material in said pixel areas, the improvement in which a relief corresponding to said ridge is fabricated by the steps of:

providing a plurality of dielectric layers on the substrates so that at least one surface of an unpatterned first dielectric layer of a dielectric composition comprising an organic polymer comes in contact with a patterned second dielectric layer of a dielectric composition comprising an organic polymer, a solvent and a dispersibility changing agent, thereby forming an assembly;

partially drying the assembly under a certain heating condition, decided by a function of heating temperature and time varied depending on the boiling points of the dispersibility changing agent and the solvent, to diffuse a desired pattern from the surface of the second dielectric layer containing the dispersibility changing agent into the interior of the first dielectric layer; and developing the assembly to remove the second dielectric layer and the area of the first dielectric layer patterned by diffusion.

2. A method of claim 1 wherein the assembly is formed by providing the first dielectric unpatterned layer on the substrate and thereon the second dielectric patterned layer.

3. A method of claim 1 wherein the assembly is formed by providing the second dielectric patterned layer on the substrate and thereon the first dielectric unpatterned layer.

4. A method of claim 1 wherein the formation of the assembly and the partial drying of the assembly are repeated.

5. A method of claim 1 wherein the dispersibility changing agent is a material which functions as a dispersant for the organic polymer contained in the first dielectric layer and has a higher boiling point than the solvent.

6. A method of claim 1 wherein a negative-working patterning is carried out by employing a solubilizer as the dispersibility changing agent.

7. A method Of making a plasma display apparatus which comprises the steps of forming a plurality of first electrodes on one of a plurality of dielectric substrates to extend in one direction; forming a plurality of second electrodes on a second substrate to extend in another direction perpendicular to said one direction; forming a ridge on at least one of said substrates to define a plurality of pixel areas, and providing a fluorescent material in said pixel areas, the improvement in which a relief corresponding to said ridge is fabricated by the steps of:

providing on the substrates an unpatterned first dielectric layer of a dielectric composition comprising an organic polymer and a patterned second dielectric layer of a dielectric composition comprising an organic polymer, a solvent, and a dispersibility changing agent, thereby forming an assembly;

drying the assembly under a certain heating condition, decided by a function of heating temperature and time varied depending on the boiling points of the dispersibility changing agent and the solvent, to diffuse a desired pattern from the surface of the second dielectric layer containing the dispersibility changing agent into the interior of the first dielectric layer;

partially developing the assembly to partially remove the second dielectric layer and the area of the first dielectric layer patterned by diffusion; and repeating the above steps of forming the assembly, drying and partially developing.

* * * * *